(12) United States Patent
Friedman et al.

(10) Patent No.: US 9,195,545 B2
(45) Date of Patent: *Nov. 24, 2015

(54) SELF-HEALING USING AN ALTERNATE BOOT PARTITION

(71) Applicant: INTERNATIONAL BUSINESS MACHINES CORPORATION, Armonk, NY (US)

(72) Inventors: Alex Friedman, Herzliya (IL); Constantine Gavrilov, Rishon-le-Zion (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 91 days.

This patent is subject to a terminal disclaimer.

(21) Appl. No.: 14/074,451

(22) Filed: Nov. 7, 2013

(65) Prior Publication Data

US 2014/0281461 A1    Sep. 18, 2014

Related U.S. Application Data

(63) Continuation of application No. 13/830,019, filed on Mar. 14, 2013.

(51) Int. Cl.
    *G06F 9/24*         (2006.01)
    *G06F 15/177*     (2006.01)
    *G06F 11/14*      (2006.01)
    *G06F 9/38*        (2006.01)

(52) U.S. Cl.
    CPC .......... *G06F 11/1417* (2013.01); *G06F 9/3861* (2013.01)

(58) Field of Classification Search
    CPC ........................... G06F 9/3861; G06F 11/1417

USPC .................................................. 713/1, 2, 100
See application file for complete search history.

(56) References Cited

U.S. PATENT DOCUMENTS

| | | |
|---|---|---|
| 7,487,343 B1 * | 2/2009 | Insley et al. ............... 713/1 |
| 7,516,319 B2 | 4/2009 | Chen |
| 7,546,449 B2 | 6/2009 | Wu |
| 7,546,450 B2 | 6/2009 | Danielsen |
| 7,594,068 B2 | 9/2009 | Diehl |
| 7,650,490 B2 | 1/2010 | Barron, Jr. et al. |
| 7,949,814 B2 | 5/2011 | Chan |
| 2004/0073783 A1 | 4/2004 | Ritchie |
| 2009/0150598 A1 | 6/2009 | Jung et al. |
| 2010/0058041 A1 | 3/2010 | John et al. |

FOREIGN PATENT DOCUMENTS

EP       1764687 B1    3/2010

OTHER PUBLICATIONS

Lin Tao et al., "Implementation of Linux in embedded system," Control & Automation No. 7: 27-149, 2005.

* cited by examiner

*Primary Examiner* — Michael J Brown
(74) *Attorney, Agent, or Firm* — Griffiths & Seaton PLLC

(57) ABSTRACT

Methods, apparatus and computer program products implement embodiments of the present invention that enable a computer system comprising networked computers to self-heal from a boot failure of one of the computers. In some embodiments, upon detecting a first computer failing to successfully load a first boot image, a second computer configures the first computer to boot a second boot image. Subsequent to configuring the first computer, the first computer is power cycled, and upon the power cycling, the first computer loads the second boot image.

9 Claims, 3 Drawing Sheets

SELF-HEALING USING AN ALTERNATE BOOT PARTITION

CROSS-REFERENCE TO RELATED APPLICATIONS

This application is a Continuation of U.S. patent application Ser. No. 13/830,019, filed on Mar. 14, 2013, and is related to U.S. patent application Ser. Nos. 13/829,612, 13/829,906, 13/830,081, and 13/830,153, each filed Mar. 14, 2013, and which are incorporated herein by reference.

FIELD OF THE INVENTION

The present invention relates generally to computer systems, and specifically to directing a computer to power cycle and boot from an alternate boot partition, also referred to herein as a rescue boot partition.

BACKGROUND

Operating systems manage the way software applications utilize the hardware of computer systems, such as storage controllers. A fundamental component of operating systems is the operating system kernel (also referred to herein as a "kernel"), which provides secure computer system hardware access to software applications executing on the computer system. Since accessing the hardware can be complex, kernels may implement a set of hardware abstractions to provide a clean and uniform interface to the underlying hardware. The abstractions provided by the kernel provide software developers easier access to the hardware when writing software applications.

Two common techniques for rebooting (i.e. restarting) an operating system are a "cold boot" and a "warm boot". During a cold boot, power to a computer system's volatile memory is cycled (i.e., turned off and then turned on), and the operating system is rebooted. Since power is cut off to the memory, any contents (i.e., software applications and data) stored in the memory prior to the cold boot are lost. During a warm boot, the operating system reboots while power is still applied to the volatile memory, thereby enabling the computer to skip some hardware initializations and resets. Additionally, during a warm boot the memory may be reset.

In addition to a warm boot and a cold boot, the Linux operating system offers a method of rapidly booting a new operating system kernel via the kexec function. The kexec function first loads a new kernel into memory and then immediately starts executing the new kernel. Using kexec to boot a new kernel is referred to a "hot" boot/reboot, since the computer's memory is not reset during the boot.

The description above is presented as a general overview of related art in this field and should not be construed as an admission that any of the information it contains constitutes prior art against the present patent application.

SUMMARY

There is provided, in accordance with an embodiment of the present invention a method, including configuring, using a second computer, a first computer having multiple boot images to boot one of the multiple boot images, subsequent to configuring the first computer, power cycling the first computer, and upon the power cycling, loading, by the first computer, the one of the multiple boot images.

There is also provided, in accordance with an embodiment of the present invention an apparatus, including a first computer including a boot device having multiple boot images, and a second computer coupled to the first computer and arranged to configure the first computer to boot one of the multiple boot images, and subsequent to configuring the first computer, to power cycle the first computer, wherein upon the power cycling, the first computer loads the one of the multiple boot images.

There is further provided, in accordance with an embodiment of the present invention a computer program product, the computer program product including a non-transitory computer readable storage medium having computer readable program code embodied therewith, the computer readable program code including computer readable program code executing on a second computer and arranged to configure a first computer having multiple boot images to boot one of multiple boot images, computer readable program code executing on the second computer and configured to power cycle the first computer subsequent to configuring the first computer, and computer readable program code executing on the first computer and configured to load the one of the multiple boot images upon the power cycling.

BRIEF DESCRIPTION OF THE DRAWINGS

The disclosure is herein described, by way of example only, with reference to the accompanying drawings, wherein.

DETAILED DESCRIPTION OF EMBODIMENTS

In computing, a boot comprises an initial set of operations that a computer performs when electrical power is switched on (also referred to as power cycling). During a boot, a computer may load software components such as an operating system kernel, services and applications. The software components that are loaded during a boot are typically stored in a system startup configuration file. For example, during a boot, a computer configured as a storage system may load a Linux operating system kernel, a network TCP/IP service and a storage application configured to process input/output (I/O) requests received from one or more host computers.

Software components that are loaded during a boot can be stored on a boot device as a boot image. When a computer system boots, the boot image is retrieved and stored in memory as a software stack. In other words, a loaded software stack may comprise an in-memory representation of a corresponding boot image on a boot device.

In a computer network coupling a first computer to a second computer, there may be instances when upon power being cycled to the first computer, the first computer fails to successfully boot a primary boot image from a boot device. Embodiments of the present invention provide methods and systems for the first computer to recover the failed boot by reconfiguring the first computer to boot a rescue boot image from the boot device, and then power cycling the first computer to boot the rescue boot image. The rescue image may comprise a "safe factory default" boot image whose components have proven to be stable.

In some embodiments, the boot device may be divided into a primary boot partition (also referred to herein as a primary partition) configured to store the primary boot image and a rescue boot partition (also referred to herein as a rescue partition) configured to store the rescue boot image. Dividing the boot device into the primary and the rescue partitions enables the (one physical) boot device to function as multiple boot devices.

There may be instances when the second computer may detect that the first computer does not respond to any conveyed requests, possibly as a result of the first computer failing to successfully load and/or execute the primary boot image. In the embodiments described herein, the second computer can reconfigure the first computer to boot from the rescue partition, and then power cycle the first computer.

While the embodiments described herein relate generally to a storage system such as clustered storage controller, it will be understood that embodiments of the present invention may also be used for other types of networked computer systems.

Figure 1:
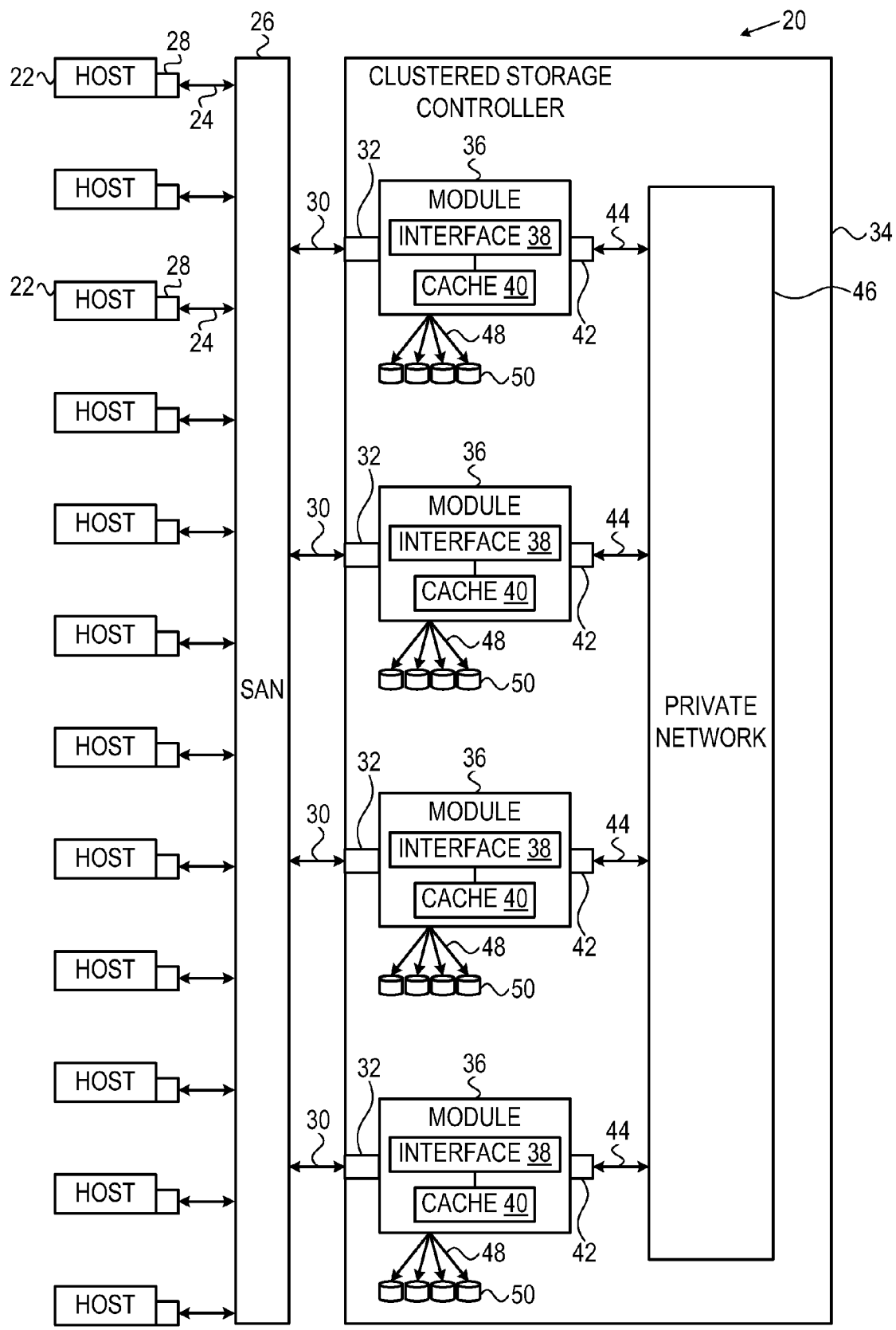
FIG. 1 is a block diagram that schematically illustrates a storage system, in accordance with an embodiment of the present invention.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

Examples of adapters 32 and 42 include switched fabric adapters such as Fibre Channel (FC) adapters, Internet Small Computer System Interface (iSCSI) adapters, Fibre Channel over Ethernet (FCoE) adapters and Infiniband™ adapters.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Python, Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/actions specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the functions/actions specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/actions specified in the flowchart and/or block diagram block or blocks.

Self-Healing from a Failed Boot

Figure 2:
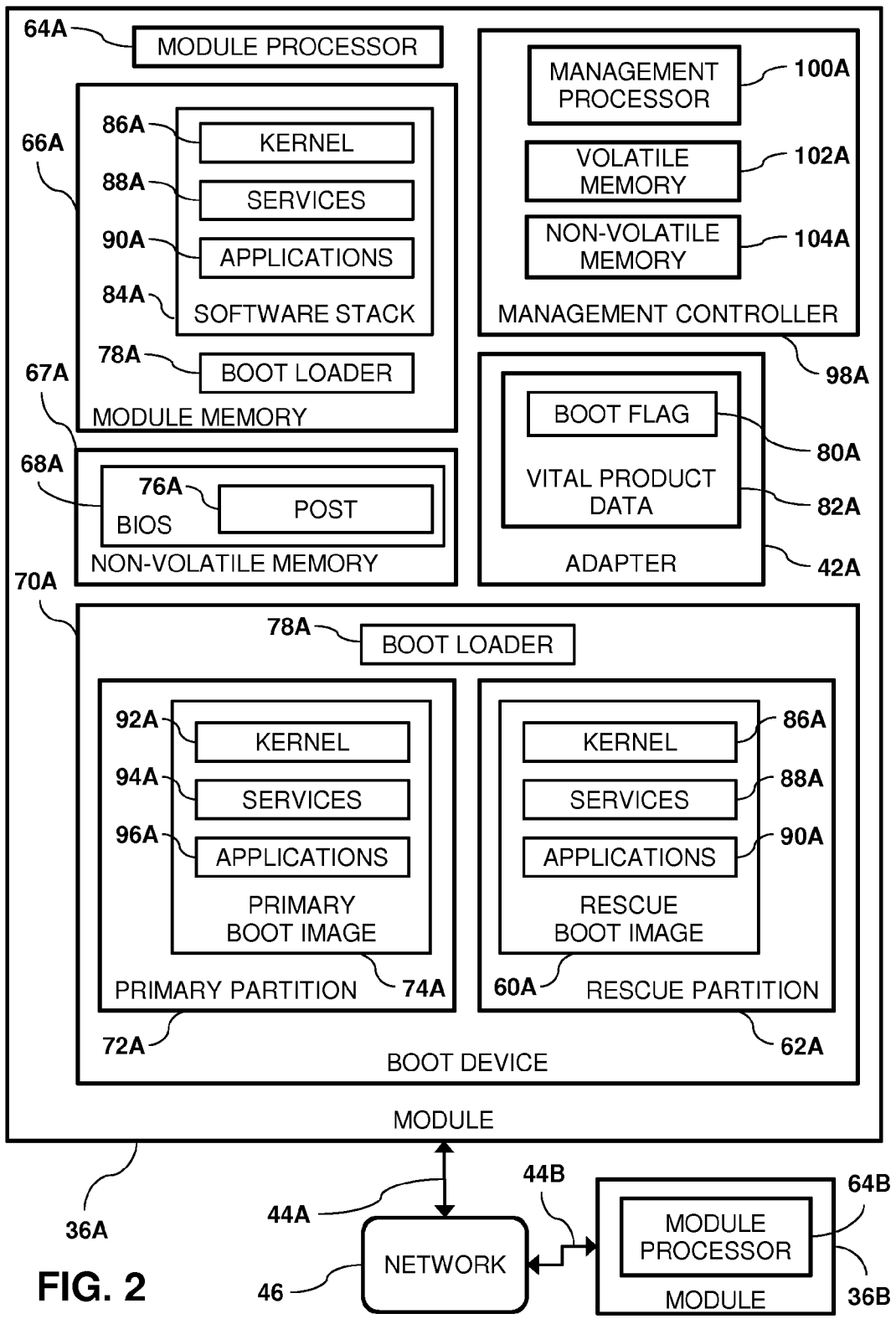
FIG. 2 is a block diagram of modules of the storage system configured to self-heal using a rescue boot image stored on a rescue boot partition, in accordance with an embodiment of the present invention.

FIG. 2 is a block diagram of modules 36 configured to self-heal using a rescue boot image 60 stored on a rescue partition 62, in accordance with an embodiment of the present invention. In storage controller 34, the self-healing embodiments described herein enable a first given module 36 to automatically detect and correct software and/or hardware failures in a second given module 36.

In the description herein, modules 36 and their respective components and data connections (i.e., data connection 44) may be differentiated by appending a letter to the identifying numeral, so that modules 36 comprise a first module 36A and a second module 36B. Alternatively a given module 36 may just be referred to as module 36. For purposes of clarity, not all components in module 36A are included in module 36A (i.e., in FIG. 2).

Module 36 comprises a module processor 64, a module memory 66, a non-volatile memory 67 and a boot device 70. In embodiments of the present invention, boot device 70 may comprise a storage device such as a hard disk, an optical disk, a flash device (such as Compact Flash, USB stick or SDCard) or a solid state drive (SSD). In the configuration shown in FIG. 2, boot device 70 comprises a primary partition 72 configured to store a primary boot image 74, and rescue partition 62 configured to store rescue boot image 60.

Non-volatile memory 67 comprises a BIOS 68 configured to store power-on self-test (POST) procedures 76. When power is cycled to module 36, processor 64 can be configured to execute POST procedures 76, which loads a boot loader 78 to memory 66.

Boot loader 78 is typically stored on a master boot record of boot device 70. When processor 64 loads and starts executing boot loader 78, the boot loader can be configured to read a boot flag 80 from vital product data (VPD) 82 of adapter 42. VPD 82 may comprise non-volatile memory configured to store boot flag 80, plus any configuration and informational data for adapter 42. Examples of adapters 42 that include VPD 82 include but are not limited to Fibre Channel and Infiniband™ adapters. Alternatively module 36 may store boot flag 80 in any VPD or non-volatile Peripheral Component Interconnect (PCI) memory of a device coupled to processor 64. In an alternative embodiment, boot flag 80 may be stored in non-volatile memory 67 or non-volatile memory 104.

In some embodiments, boot loader 78 can be configured to load, depending on the value stored in boot flag 80, either primary boot image 74 or rescue boot image 60, and store the components of the loaded boot image to a software stack 84 in memory 66. Each of boot images 60 and 74 comprise an initial collection of components that boot loader 78 can load, upon power being cycled to module 36. Rescue boot image 60 comprises a kernel 86, one or more services 88 and one or more applications 90. Primary boot image 74 comprises a kernel 92, one or more services 94 and one or more applications 96.

Rescue boot image 60 may comprise a "safe factory default" boot image that is considered to be stable, and primary boot image 74 may comprise an updated version of the rescue boot image. In embodiments of the present invention, upon failing to successfully load primary boot image 74, processor 64 loads rescue boot image 60 to software stack 84, and starts executing kernel 86, services 88 and applications 90 from the software stack in memory 66.

Module 36 also comprises a management controller 98 that is configured to monitor the module's operation, and to reconfigure hardware and/or software settings as necessary in order to optimize the module's performance. Management controller 98 comprises a management processor 100, a volatile memory 102 and a non-volatile memory 104. While managing module 36, management processor 100 may access (i.e., read data from and write data to) module memory 66 and VPD 82 (or any non-volatile PCI memory, as described supra). Additionally, management processor 100 may be configured to power cycle module 36, and to communicate with the other modules in storage controller 34.

Processor 64 typically comprises a general-purpose central processing unit (CPU), which is programmed in software to carry out the functions described herein. The software may be downloaded to module 36 in electronic form, over a network, for example, or it may be provided on non-transitory tangible media, such as optical, magnetic or electronic memory media. Alternatively, some or all of the functions of processor 64 may be carried out by dedicated or programmable digital hardware components, or using a combination of hardware and software elements.

Typically, management controller 98 is implemented as a "system-on-chip" (SOC), running an embedded software application. In this alternative embodiment, the SOC may execute a software stack comprising a "standard" operating system (OS) and services (e.g., a Linux™ kernel and a web server) that are typically not user-upgradeable. The SOC is typically dedicated (i.e., not general purpose) and may be tightly controlled by a vendor. In other words, upgrades are typically provided by the vendor (or manufacturer), and may be considered a "system firmware", similar to BIOS 68.

The SOC may function as a robust, self-healing and self-sufficient system, configured to control processor 64 and the module processor's peripheral hardware, even when the controlled hardware malfunctions or crashes. This robustness may be possible because the hardware and software components of management controller 98 are typically designed to be self-sufficient and durable. Additionally, since management controller 98 may be configured to run a "controlled" software designed for a specific purpose (i.e., an end-user is typically not able to load the general purpose software stack to memory 102 or memory 104), the management controller can be more stable than kernel 86 running on processor 64, and therefore the management controller may be configured to control the module processor.

While the embodiments describe herein have software stack 84 comprising kernel 86, services 88 and applications 90, any organized collection comprising any number of components in memory 66 is considered to be within the spirit and scope of the present invention. For example, the collection (e.g., software stack 84) may comprise only kernel 86.

Figure 3:
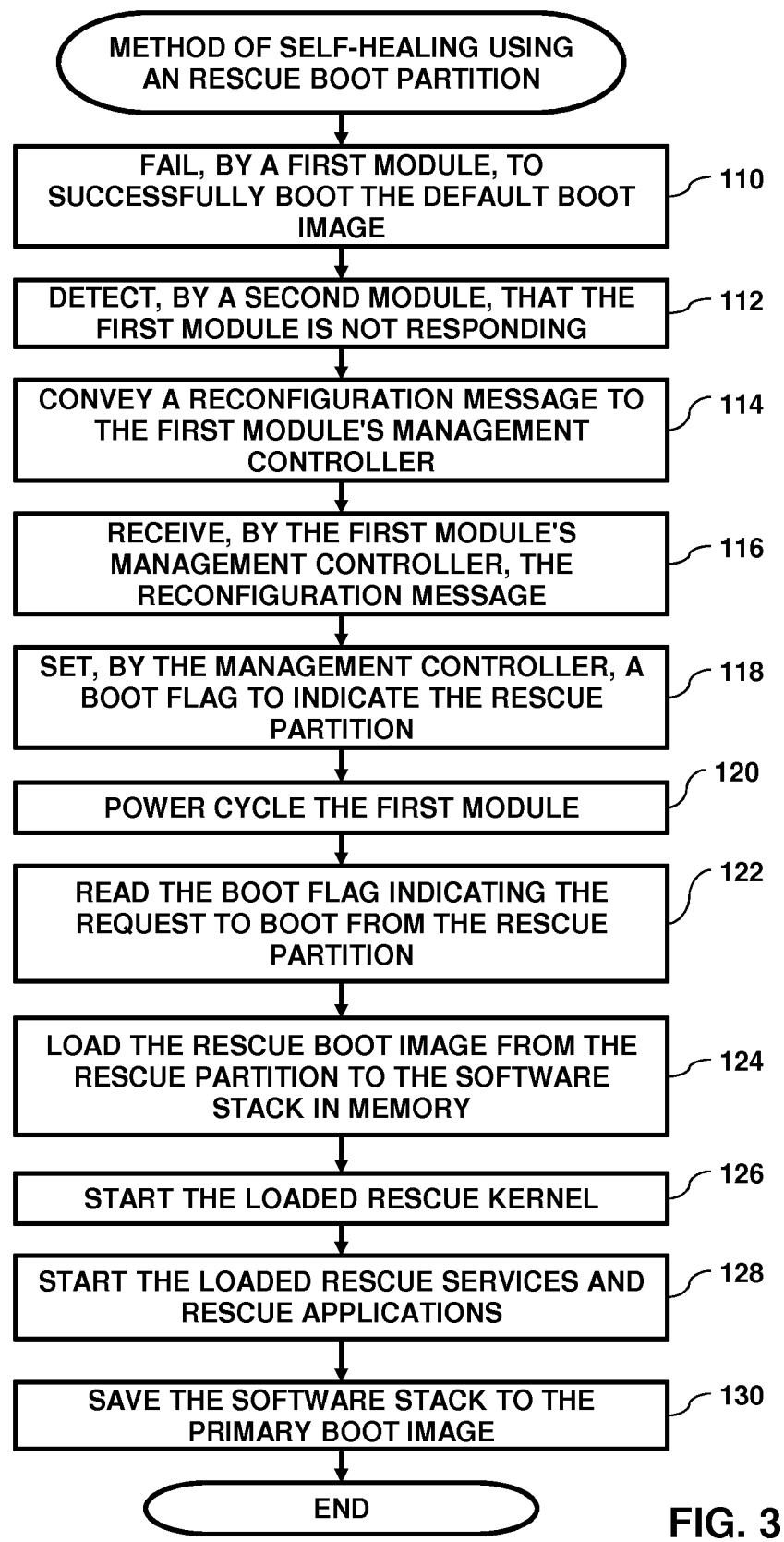
FIG. 3 is a flow diagram that schematically illustrates a method of self-healing using the rescue boot partition, in accordance with an embodiment of the present invention.

FIG. 3 is a flow diagram that schematically illustrates a method for storage controller 34 to self-heal (i.e., from a failure of module 36A) using rescue boot image 60A, in accordance with an embodiment of the present invention. In the embodiments described herein, module 36A is initially configured (i.e., via a first value stored in boot flag 80A) to boot primary boot image 74A from primary partition 72A.

In an initial step 110, power is cycled to module 36A, and processor 64A fails to boot (i.e., load and execute) primary boot image 74A from primary partition 72A. The boot failure may be a result of a corrupted primary boot image 74A or a problem with one of the physical regions storing the primary boot image on primary partition 72A. Alternatively, one of the software components in the primary boot image may fail to execute properly. For example, a given service 88A (e.g., a TCP/IP service) may have been recently upgraded, and the given service crashes upon being executed.

In a detect step 112, module 36B attempts to communicate with module 36A, and detects that module 36A is not responding. For example, processor 64B may convey, via a unicast transmission, a request to processor 64A, and not receive a reply within a given time period. Upon not receiving a reply, processor 64B, in a conveying step 114, conveys a reconfiguration message (e.g., via a second unicast transmission) to management controller 98A.

In a receive step 116, management processor 100A receives the reconfiguration message, and in a reconfiguration step 118, the management processor stores a second value to boot flag 80, thereby instructing boot loader 78A to boot rescue boot image 60A from rescue partition 62A when power is cycled to module 36A. In a power cycling step 120 management processor 100A power cycles module 36A. When power is cycled to module 36A, processor 64A executes POST procedures 76A and loads boot loader 78A.

In a read step 122, boot loader 78A reads boot flag 80. Since boot flag 80 currently stores the second value (see step 118) that indicates a request to boot from the rescue partition, in a load step 124, boot loader 78A accesses rescue partition 62A, retrieves rescue boot image 60A from the rescue partition and stores the components of the rescue boot image to software stack 84A in memory 66A.

In a boot step 126, processor 64A starts executing (i.e., boots) rescue boot kernel 86A, and in a start step 128, the processor starts executing rescue services 88A and rescue applications 90A. Finally, in a save step 130, processor 64A saves software stack 84A to primary boot image 74A, and the method ends. In some embodiments (e.g., if one or more regions in primary partition 72A were not readable), processor 64A may reformat the primary partition prior to saving software stack 84A to the primary partition. Additionally, after successfully saving software stack 84A to primary partition 72A, processor 64A may store the first value to boot flag 80A, thereby reconfiguring module 36A to boot from the primary partition.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
configuring, using a second computer, a first computer having multiple boot images to boot one of the multiple boot images, the multiple boot images stored each on a plurality of partitions;
subsequent to configuring the first computer, power cycling the first computer; and
upon the power cycling, loading, by the first computer, the one of the multiple boot images.

2. The method according to claim 1, wherein each of the multiple boot images comprises one or more components that are selected from a list comprising an operating system kernel, a service, and a software application.

3. The method according to claim 2, wherein the multiple boot images comprise a primary boot image stored on a primary partition of a boot device and a rescue boot image stored on a rescue partition of the storage device, and wherein the one of the multiple boot images comprises the rescue boot image.

4. The method according to claim 3, wherein the second computer configures the first computer to load the rescue boot image in response to detecting the first computer failing to successfully load and execute the primary boot image.

5. The method according to claim 4, wherein detecting the first computer failing to successfully load and execute the primary boot image comprises the first computer failing to respond to a request from the second computer.

6. The method according to claim 2, wherein loading the one of the multiple boot images comprises retrieving the one or more software components from the one of the multiple boot images, storing the retrieved one or more components to a software stack in a memory, and executing the one or more components in the software stack.

7. The method according to claim 6, and comprising saving the one or more components to the primary boot image, and reconfiguring the first computer to boot the primary boot image.

8. The method according to claim 1, wherein configuring the first computer to boot the one of the multiple boot images comprises storing, to a non-volatile memory, a value indicating the one of the multiple boot images.

9. The method according to claim 8, and comprising prior to loading the one of the multiple boot images, retrieving, from the non-volatile memory, the value indicating the one of the multiple boot images.

* * * * *